United States Patent
Getman et al.

(10) Patent No.: US 8,384,170 B2
(45) Date of Patent: Feb. 26, 2013

(54) PRESSURE SENSOR

(75) Inventors: Igor Getman, Lörrach (DE); Anh Tuan Tham, Berlin (DE); Dieter Stolze, Potsdam (DE)

(73) Assignee: Endress + Hauser GmbH + Co. KG, Hauptstrasse, Maulburg (DE)

( * ) Notice: Subject to any disclaimer, the term of this patent is extended or adjusted under 35 U.S.C. 154(b) by 465 days.

(21) Appl. No.: 12/449,821

(22) PCT Filed: Mar. 4, 2008

(86) PCT No.: PCT/EP2008/052583
§ 371 (c)(1),
(2), (4) Date: Jan. 29, 2010

(87) PCT Pub. No.: WO2008/107427
PCT Pub. Date: Sep. 12, 2008

(65) Prior Publication Data
US 2010/0140725 A1 Jun. 10, 2010

(30) Foreign Application Priority Data
Mar. 5, 2007 (DE) .................... 10 2007 010 913

(51) Int. Cl.
*H01L 29/84* (2006.01)

(52) U.S. Cl. ......... 257/419; 257/E29.324; 257/E21.218; 438/53

(58) Field of Classification Search .................. 257/419, 257/E29.324, E21.218, E21.219, E21.231; 438/53, 459
See application file for complete search history.

(56) References Cited

U.S. PATENT DOCUMENTS

| | | | |
|---|---|---|---|
| 5,013,681 A * | 5/1991 | Godbey et al. | 438/459 |
| 5,223,444 A * | 6/1993 | Mosser et al. | 438/53 |
| 6,284,670 B1 * | 9/2001 | Abe et al. | 438/745 |
| 6,595,066 B1 | 7/2003 | Kurtz et al. | |
| 6,619,133 B1 * | 9/2003 | Goshoo et al. | 73/754 |
| 6,901,804 B2 * | 6/2005 | Torkkeli | 73/716 |
| 2003/0146447 A1 * | 8/2003 | Sautter et al. | 257/108 |
| 2004/0126914 A1 * | 7/2004 | Chang et al. | 438/30 |
| 2005/0274191 A1 | 12/2005 | Hasegawa et al. | |
| 2007/0035207 A1 * | 2/2007 | Kawamura et al. | 310/324 |
| 2007/0077676 A1 * | 4/2007 | Shao et al. | 438/51 |

FOREIGN PATENT DOCUMENTS

| | | |
|---|---|---|
| DE | 697 13 433 T2 | 2/2003 |
| FR | 2 883 372 A1 | 9/2006 |
| JP | 59228141 A | 12/1984 |
| WO | WO 00/37912 | 6/2000 |

OTHER PUBLICATIONS

Min-Hang Bao et al., Micromachined Beam-diaphragm Structure Improves Performances of Pressure Transducer, Feb. 1990, Sensors and Actuators, pp. 137-141, Lausanne, Switzerland.
Hermann Sandmaier, Low-Pressure Sensor with Bossed Diaphragm, 1991, pp. 393-401, Great Britain.
A. Merlos et al., Optimized Technology for the Fabrication of Piezoresistive Pressure Sensors, Dec. 1999, pp. 204-208.

* cited by examiner

*Primary Examiner* — Wensing Kuo
(74) *Attorney, Agent, or Firm* — Bacon & Thomas, PLLC

(57) ABSTRACT

A piezoresistive pressure sensor is especially suitable for measuring smaller pressures and has a small linearity error. The pressure sensor is manufactured from a BESOI wafer having first and second silicon layers and an oxide layer arranged therebetween. The pressure sensor includes, formed from the first silicon layer of the BESOI wafer, an active layer, in which piezoresistive elements are doped, and, formed from the second silicon layer of the BESOI wafer, a membrane carrier, which externally surrounds a cavity in the second silicon layer, via which a membrane forming region of the active layer and an oxide layer associated therewith are exposed, wherein, in an outer edge of the region of the oxide layer exposed by the cavity, a groove is provided surrounding the region.

13 Claims, 3 Drawing Sheets

PRESSURE SENSOR

TECHNICAL FIELD

The invention relates to a pressure sensor.

BACKGROUND DISCUSSION

Pressure sensors serve for registering pressures and are applied, for example, in pressure measuring devices, which are used in industrial measurements technology.

In pressure measuring technology, popularly applied as pressure sensors are so-called semiconductor sensors, e.g. silicon chips with doped, piezoresistive, resistance elements. Semiconductor sensors of this type include, arranged on a carrier, a measuring membrane, or diaphragm, whose one side is exposed in measurement operation to a pressure to be measured. Pressure sensor chips are, as a rule, very sensitive and are therefore not directly exposed to a medium, whose pressure is to be recorded. Instead, a liquid filled, pressure transfer means is interposed. Pressure acting on the measuring membrane effects a pressure-dependent deflection of the measuring membrane, which is registered by means of the doped resistance elements and converted into an electrical signal, which is then available for additional processing and/or evaluation.

Semiconductor sensors are today regularly produced using silicon, e.g. by use of Silicon On Insulator (SOI) technology. In such case, preferably BESOI (Bonded and Etched-back Silicon On Insulator) wafers are used as starting material. BESOI wafers are produced by means of "silicon direct bonding". For this, two oxidized silicon wafers are placed together and bonded under pressure and high temperature. In this way, a three layer wafer is obtained, wherein, between two silicon layers, an oxide layer is located. The buried oxide layer, referred to with the acronym BOX (Buried OXide layer), has a thickness of a few nm up to a few μm. This composite is thinned and polished from one side. The thinned, polished side becomes the active layer. The active layer can be a few μm thick and is referred to in the English language literature as e.g. device wafer or Silicon OverLayer (SOL). The thickness of the active layer can be produced with today's manufacturing processes very exactly and uniformly and with high reproducibility.

An essential advantage of the application of BESOI wafers for the manufacture of pressure sensors is that the buried oxide layer (BOX) forms a reliable etch stop. This is utilized, above all, for the manufacture of movable electrodes of capacitive pressure sensors. There are, however, also methods known, in the case of which, BESOI wafers are applied for the manufacture of piezoresistive pressure sensors. Such a method is described in the article: "Optimized technology for the fabrication of piezoresistive pressure sensors", by A. Merlos, J. Santander, M. D. Alvares and F. Campabadal, published in the year 2000 in the Journal of Mechanical Engineering, Vol. 10, pages 204 to 208. There, it was shown, that one can produce, with BESOI wafers, sensor chips, which have an exactly defined membrane thickness, which is constant over the entire region of the membrane. Especially, piezoresistive sensors can be produced with very thin membranes with smallest of thickness tolerances of less than 1 μm. For this, there is etched into the silicon layer lying opposite to the active layer a cavity, via which the membrane is exposed. In such case, the buried oxide layer serves as etch stop. The outer edge of the silicon layer remaining after the etching procedure borders the cavity externally and forms a carrier for the membrane exposed through the cavity. Following this etching procedure, the region of the oxide layer serving as etch stop is removed by an additional etching procedure.

The sensitivity of piezoresistive pressure sensors is inversely dependent on the thickness of the membrane. The thinner the membrane, the more sensitive is the sensor. Unfortunately, however, also non-linearity of the sensors rises as membranes become thinner. The electrical measurement signal read from the doped resistances rises in the ideal case linearly with the pressure acting on the membrane. The thinner the membrane is, the greater are the deviations from this desired, linear relationship. This leads, especially in the case of pressure sensors for measuring smaller pressures, which need thin membranes, to measurement errors, or to a high effort for the compensation of such measurement errors.

A solution for this problem is to equip the membrane with a bending-stiff center. Such a bending-stiff center is produced, for example, on the rear side of the membrane facing away from the active layer by suitable working of the silicon to provide there a centrally arranged, silicon pedestal. The height of the pedestal is slightly smaller than the height of the membrane carrier surrounding the exterior of the pedestal. In this way, it is assured, that the pedestal is supported exclusively by the membrane, and, especially, that it does not lie against a holder, on which the membrane carrier is supported. Pedestal and membrane carrier are separated from one another by a cylindrical gap surrounding the pedestal, through which an outer edge of the membrane is exposed. In this way, a higher ratio of sensitivity to non-linearity is achievable. However, a bending-stiff center means that the membrane is thereby, on the whole, stiffer and, therewith, insensitive. The increasing of the ratio means a reducing of the sensitivity of the pressure sensor, which, especially in the case of measuring smaller pressures, is disadvantageous. Often, a compromise must be accepted in such case.

In US-A 2005/0274191, a method is described, with which the sensitivity of piezoresistive pressure sensors can be increased. For this, a part of the active layer in the immediate environment of the doped piezoresistive elements is etched away in such a manner, that the elements are surrounded by a furrow. The depth of the furrows is equal in such case to about the thickness of the doped resistances. The furrows act as stress concentrators and effect, therewith, an increasing of the sensitivity of the sensors, without requiring that the membrane must be enlarged, or its thickness reduced over a large amount of its total surface area.

This method is burdened, however, by the disadvantage, that temperature dependent stress states can occur on the front side of the membrane exposed in measurement operation to the pressure to be measured. Such stress states are attributable to the different thermal coefficients of expansion of silicon and the buried oxide layer and the different geometries of the two membrane sides. These stress states are temperature-dependent and lead to measurement errors. This effect arises especially strongly, since these thermal stress states occur in the immediate vicinity of the doped piezoresistive elements and these elements react very sensitively to stresses.

SUMMARY OF THE INVENTION

It is an object of the invention to provide a piezoresistive pressure sensor in BESOI technology, which is suitable, especially, for measuring smaller pressures and has a small linearity error.

To this end, the invention resides in a pressure sensor manufactured from a BESOI wafer having first and second silicon layers and an oxide layer arranged therebetween, wherein the pressure sensor includes:

an active layer formed from the first silicon layer of the BESOI wafer, and piezoresistive elements doped in the active layer; and a membrane carrier formed from the second silicon layer of the BESOI wafer, wherein the membrane carrier externally surrounds a cavity in the second silicon layer, via which a membrane forming region of the active layer and an oxide layer associated therewith are exposed and wherein, in an outer edge of the region of the oxide layer exposed by the cavity, a groove is provided surrounding the region.

In a further development, the groove is a cavity in the oxide layer, which, in cross section, has a rounded geometry.

In an additional, further development, the doped piezoresistive elements are arranged in the membrane at locations on the membrane upper surface, where the groove extends on the oppositely lying, membrane lower surface.

In an additional, further development, the membrane formed by a region of the active layer and the region of the oxide layer associated therewith has a square footprint, and the piezoresistive elements are arranged in the corners of such region of the active layer.

Additionally, the invention resides in a method for manufacture of a pressure sensor of the invention from a BESOI wafer having first and second silicon layers and an oxide layer arranged therebetween, wherein, from the first silicon layer, an active layer is formed, into which piezoresistive elements are doped, from the second silicon layer, a membrane carrier is formed, which externally surrounds a cavity in the second silicon layer, via which a membrane forming region of the active layer and an oxide layer associated therewith are exposed, wherein the cavity is formed by removing silicon present in the region of the cavity by means of an etching method, wherein the oxide layer is used as etch stop, and in an outer edge of the region of the oxide layer exposed by the cavity, a groove surrounding the region is etched by means of an isotropic etching method.

In a further development of the method, the groove is produced by applying a photomask by means of photolithography, etching the groove into the oxide layer by means of pure plasma etching with chemically reactive gases, especially with $CF_4+O_2$ or $SF_6+O_2$, and removing the photomask.

In a first alternative further development of the method, the groove is produced by applying a photomask by means of photolithography, etching the groove into the oxide layer by means of an isotropic, wet chemical process, especially by means of an etching solution of hydrofluoric acid, nitric acid and acetic acid with different etching rates for silicon and silicon oxide, and removing the photomask.

In a second alternative further development of the method, the groove is produced by applying a photomask by means of photolithography, etching the groove into the oxide layer by means of a combination of an isotropic, wet chemical etching procedure, especially by applying hydrofluoric acid buffered with ammonium fluoride (BHF), and an isotropic, dry chemical etching procedure, especially a Deep Reactive Ion Etching (DRIE), and removing the photomask.

The pressure sensor of the invention offers the advantage that, in the case of the small membrane thicknesses in the order of magnitude of 20 µm required for measuring smaller pressures, especially in the case of pressures of less than 100 mbar, it has a small linearity error, due to the oxide layer located on the lower surface of the membrane. In such case, the oxide layer affects the linearity in a manner similar to a bending-stiff center, without that thereby the sensitivity of the sensor is significantly reduced. The reason for this lies in the fact that the oxide layer is very thin in comparison with the membrane, and, therewith, the stiffness of the membrane is only insignificantly increased.

In contrast, bending-stiff centers having pedestals formed on the membrane and having a height typically a number of times greater than the membrane thickness, lead to a marked reduction of the sensitivity.

A further advantage of the invention is that the sensitivity of the pressure sensors of the invention is markedly increased by the groove surrounding the exposed region of the oxide layer, in that mechanical stresses effected by an acting pressure are concentrated by the groove at the locations of the doped piezoresistive elements.

The invention permits, consequently, measurement of very low pressures of less than 100 mbar with high accuracy of measurement.

BRIEF DESCRIPTION OF THE DRAWINGS

The invention and its advantages will now be explained in greater detail on the basis of the figures the drawing, in which two examples of embodiments are presented. Equal elements are provided in the figures with equal reference characters. The figures of the drawing show as follows.

DETAILED DISCUSSION IN CONJUNCTION WITH THE DRAWINGS

Figure 1:
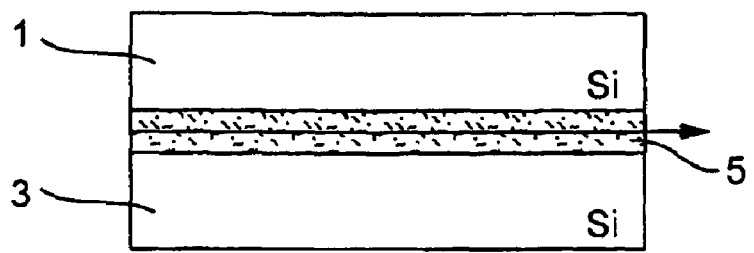
FIG. 1 is a section through a BESOI wafer.

The pressure sensor of the invention is a semiconductor sensor using silicon, which is produced by applying Silicon On Insulator (SOI) technology. Serving as starting material in such case is a conventional BESOI (Bonded and Etched-back Silicon On Insulator) wafer. BESOI wafers are produced, for example, from two oxidized silicon wafers, which are placed together and bonded under pressure and high temperature. In this way, there is obtained, as shown in FIG. 1, a three layer wafer, which includes first and second silicon layers 1, 3. Between the first and second silicon layers 1, 3 is located an oxide layer 5. This buried oxide layer 5, which is referred to as the BOX (Buried OXide layer), has a thickness of a few nm up to a few µm.

The resulting composite is thinned and polished from one side. The thinned and polished side becomes the active layer 7. The active layer can be a few µm thick and is referred to in the English language literature as the device wafer or as the Silicon OverLayer (SOL). The thickness of the active layer can, with today's manufacturing processes, be produced very exactly and uniformly and with high reproducibility.

Figure 2:
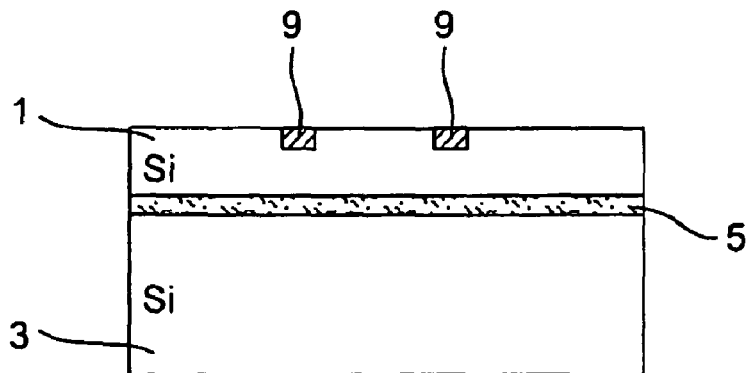
FIG. 2 is a section through a BESOI wafer as in FIG. 1, wherein an active layer has been formed from its first silicon layer.

Doped into the active layer 7, as in the case of conventional pressure sensors, are piezoresistive elements 9. Appropriate manufacturing methods are known in semiconductor technology, and, consequently, are not explained in further detail here. FIG. 2 shows a section through a wafer having an active layer 7 containing doped piezoresistive elements 9. The piezoresistive elements 9 are preferably resistors, which convert a thereon acting pressure, or a thereon acting, mechanical stress, into an electrical signal, which can be supplied via appropriate connections (not shown) provided in the active layer 7 to a further processing and/or evaluation. In such case, the elements 9 can be connected as individual elements, or combined to a bridge circuit.

Figure 3:
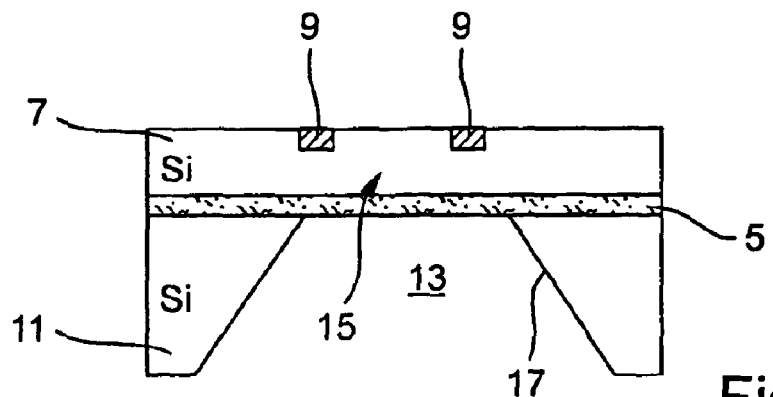
FIG. 3 is a section through a BESOI wafer as in FIG. 1, wherein a membrane carrier has been formed from its second silicon layer.

Formed from the second silicon layer 3 is a membrane carrier 11. This is shown in FIG. 3. The membrane carrier 11 is a frame connected fixedly with an outer edge of the oxide layer 5. The frame externally surrounds a cavity 13 in the second silicon layer 3. Cavity 13 exposes a region of the active layer 7 and the oxide layer 5 associated therewith, bounded by the frame. The exposed region and oxide layer become the membrane 15. Preferably, the cavity 13 has an inner lateral surface 17 conically tapering in the direction of the oxide layer 5. This form offers the advantage of increased mechanical stability of the pressure sensor.

A pressure acting on an upper side of the membrane 15 facing away from the oxide layer 5 leads to a pressure dependent deflection of the membrane 15, which is registered by means of the doped piezoresistive elements 9 in the upper side of the active layer 7 and converted into a pressure dependent, electrical signal.

Cavity 13 is produced by an etching method, with which the silicon present in the region of the cavity 13 is removed. In such case, the buried oxide layer 5 serves as an etch stop. The outer edge of the silicon layer 3 remaining after the etching procedure borders the cavity 13 externally and forms the membrane carrier 11 for the membrane 15 exposed by the cavity 13. This procedure offers the advantage, that membranes 15 manufactured therewith have an exactly defined, membrane thickness, which is constant over the entire region of the membrane. Especially, very thin membranes 15 of less than 1 µm, with smallest thickness tolerances, can be produced.

Figure 4:
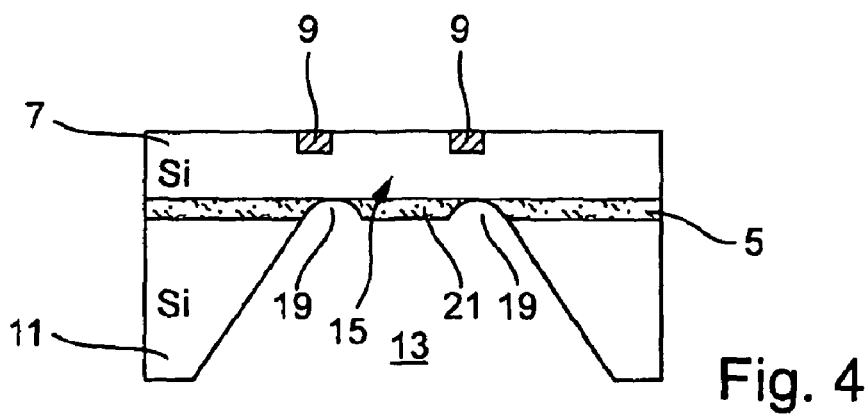
FIG. 4 is a section through a pressure sensor of the invention.

According to the invention, there is provided, in an outer edge of the region of the oxide layer 5 exposed by the cavity 13, a groove 19 surrounding the region. FIG. 4 shows a pressure sensor of the invention with the groove 19. The region 21 of the oxide layer 5 enclosed by the groove 19 is very thin in comparison to the thickness of the membrane 15 and has a very uniform thickness over its entire area. The thickness of the oxide layer 5 amounts, for example, to 1 to 2 µm. The thickness of the membrane 15 amounts, for example, to 20 µm.

Preferably, the piezoresistive elements 9 doped into the membrane 15 are arranged at locations on the membrane upper surface, where the groove 19 extends on the oppositely lying, lower surface of the membrane. This leads to a higher sensitivity of the pressure sensor, since mechanical stresses effected by pressure acting on the membrane upper surface concentrate, based on the groove 15, especially at the locations, where the piezoresistive elements 9 are located. An essential advantage of the arrangement of the groove 19 on the membrane lower surface is that the membrane upper surface is uniform in the vicinity of the doped piezoresistive elements 9. In this way, the desired, pressure dependent, mechanical stresses are amplified in the region of the piezoresistive elements 9, without that, in given cases, thermal stresses related to the groove 19 occur in the immediate vicinity of the elements 9. The reason for this is that the groove 19 is located on the membrane lower surface, and, thus, is spaced from the piezoresistive elements 9 located on the membrane upper surface. This leads to a clearly lessened, temperature dependent, measurement error compared to the state of the art, wherein stress concentrators are located on the membrane upper surface in the immediate vicinity of the piezoresistive elements.

The effect of the concentration of the pressure related, mechanical stresses is especially large, when the membrane 15, as formed by a region of the active layer 7 and the therewith associated region of the oxide layer 5, has a rectangular or square footprint, and the piezoresistive elements 9 are arranged in the corners of this region of the active layer 7. The invention is, however, naturally also applicable in connection with membranes having footprints shaped in other ways. An example is membranes with round footprints. Also in connection with other geometries of the membrane footprint, the oxide layer effects a clear reducing of the linearity error.

Figure 5:
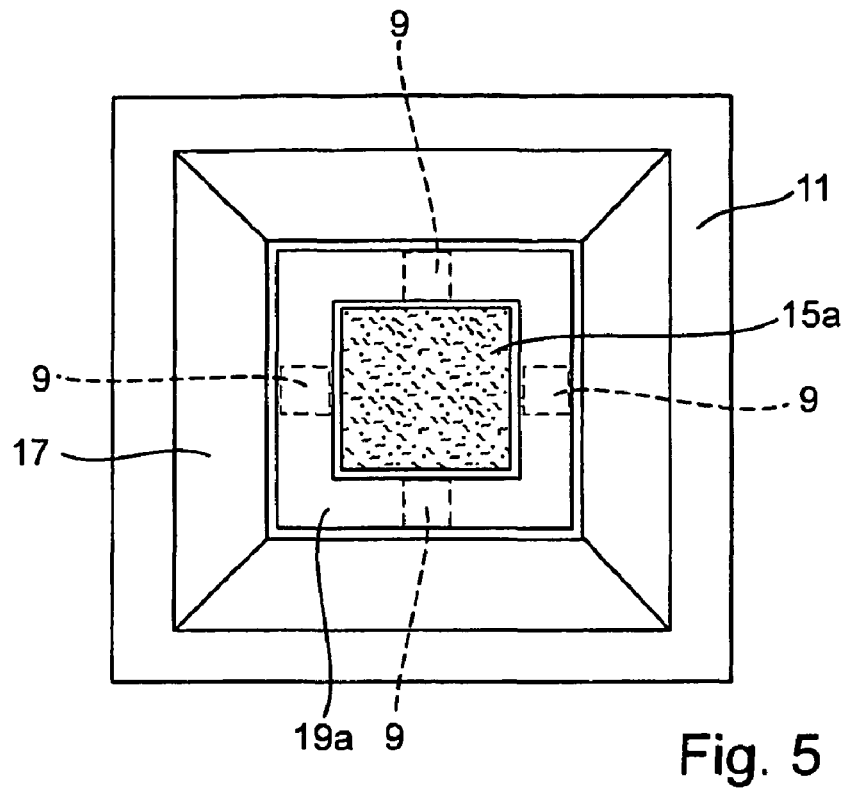
FIG. 5 is a view of the membrane rear side in the case of a first variant of a pressure sensor of the invention.
Figure 6:
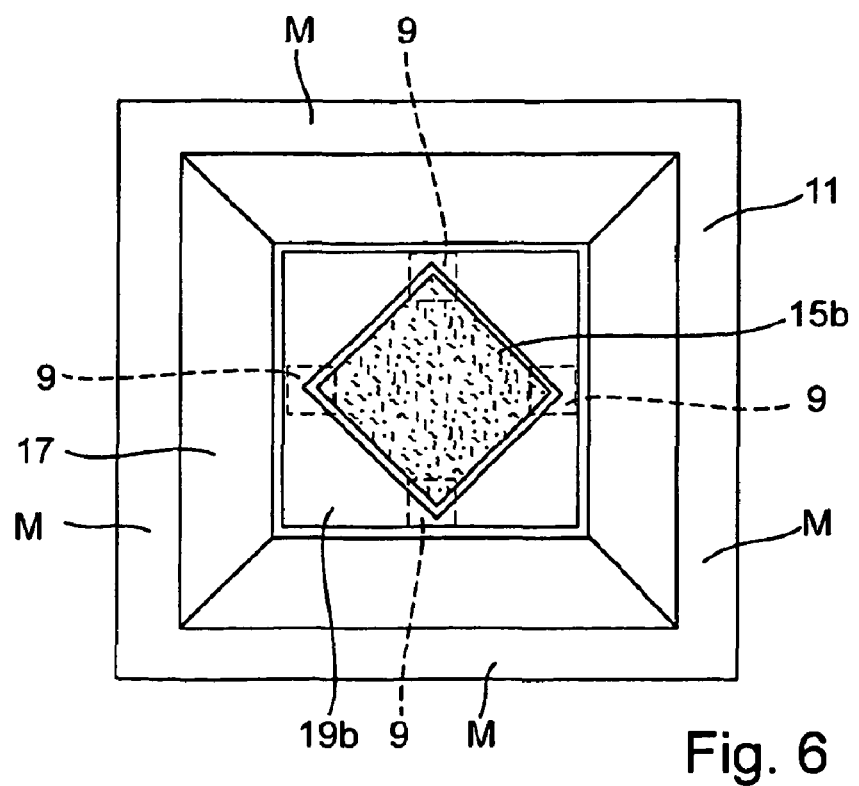
FIG. 6 is a view of the membrane rear side in the case of a second variant of a pressure sensor of the invention.

FIGS. 5 and 6 show two examples of embodiments in this connection. In each case, a view is presented of the underside of the pressure sensor facing away from the active layer 7.

In the case of the example of an embodiment illustrated in FIG. 5, a membrane 15a having a square footprint is shown, which is framed by a square membrane carrier 11 having a cavity 13, which is square in cross section. Membrane 15a is arranged in such a manner, that its external sides extend parallel to the external sides of the membrane carrier 11. It is surrounded by a groove 19a etched into the oxide layer 5. Groove 19a has a footprint in the shape of a square frame surrounding the membrane 15a. The position of the piezoresistive elements 9 on the oppositely lying, membrane upper surface is drawn with dashed lines. They are placed at locations on the membrane upper surface, where the groove 19a extends on the oppositely lying, membrane lower surface. In the example of an embodiment illustrated in FIG. 5, groove 19a has four identical, straight sections, which together form a square frame. The four piezoresistive elements 9 are located on the membrane upper surface at locations where, on the oppositely lying, membrane lower surface, in each case, the midpoint of the therebeneath extending section of the groove 19a is located.

In the case of the example of an embodiment illustrated in FIG. 6, membrane 15b has, likewise, a square footprint, which is framed by the square membrane carrier 11 having a cavity 13, which is square in cross section. In contrast to the example of an embodiment illustrated in FIG. 5, membrane 15b is arranged in such a manner, that the corners of the square footprint of the membrane 15b in each case point to the midpoints M of the respective external sides of the membrane carrier 11. Membrane carrier 11 and cavity 13 are identical in both examples of embodiments. The groove 19b extending in the oxide layer 5 has here a footprint matched to the orientation of the membrane 15b. Also here, four piezoresistive elements 9 are provided on the membrane upper surface, and the groove 19b extends on the oppositely lying, underside, under the piezoresistive elements 9. In contrast to the example of an embodiment illustrated in FIG. 5, the piezoresistive elements 9 here are located in the four corners of the membrane 15b. This arrangement leads to an especially notable concentration of the pressure related mechanical stresses at the locations where the piezoresistive elements 9 are located, and therewith, to an especially large increasing of the sensitivity of the pressure sensor.

Preferably, groove 19 is a cavity in the oxide layer 5, which has, in cross section, a rounded geometry. In the example of an embodiment illustrated in FIG. 4, groove 19 has a circular segment shaped, cross section. This rounded shape of the groove 19 offers the advantage, that thereby, the burst strength of the pressure sensor is increased.

In the manufacture of the pressure sensor of the invention, the cross sectionally rounded geometry of the groove 19 is preferably produced by application of an isotropic etching method. An isotropic etching is achievable by means of a dry chemical etching method. An example of a dry chemical etching process is the Bosch method. Due to the small etching depth of preferably 1 to 2 μm required for the groove 19, however, also very much less complex and cost-effective, wet chemical, etching methods can be applied.

Preferably, the etching of the groove 19 occurs by means of a pure plasma etching. In such case, in a first working step, a photomask is applied by means of photolithography. Then, groove 19 is etched into the oxide layer 5 by means of a pure plasma etching with chemically reactive gases, especially with $CF_4+O_2$ or $SF_6+O_2$. This method offers the advantage that the geometry of the groove 19 can be essentially freely configured, and the etching selectivity between silicon and silicon oxide is very large. Subsequently, the photomask is removed.

Alternatively, the groove 19 can be produced according to another method of the invention, wherein, in a first working step, a photomask is applied by means of photolithography. Then, groove 19 is etched into the oxide layer 5 by means of an isotropic, wet chemical process, especially by means of an etching solution of hydrofluoric acid, nitric acid and acetic acid having different etching rates for silicon and silicon oxide. Then, the photomask is removed.

Another alternative is offered by a method, wherein a photomask is applied by means of photolithography, and the groove 19 is etched into the oxide layer 5 by means of a combination of an isotropic, wet chemical, etching procedure and an isotropic, dry chemical, etching procedure. The wet chemical, etching procedure can be performed, for example, by applying hydrofluoric acid buffered with ammonium fluoride (BHF). For the dry chemical etching procedure, for example, a method, such as the Deep Reactive Ion Etching (DRIE) method, can be used. In such case, a highly reactive gas, e.g. $SF_6$, is introduced into a reactor, in which the pressure sensor is located. By producing an energy rich, high frequency plasma and accelerating the ions in an electrical field, an isotropic, chemical and physical, etching reaction is brought about. Then, also here, the photomask is removed.

Figure 7:
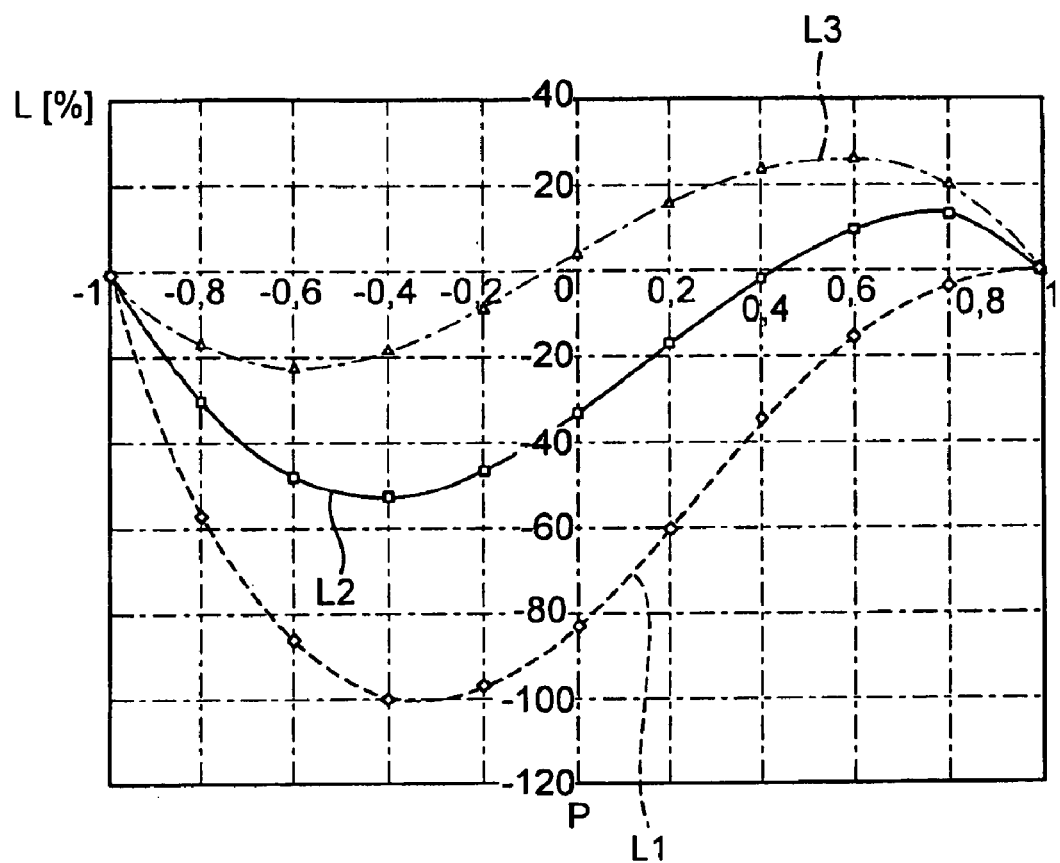
FIG. 7 a linearity error of three pressure sensors of different oxide layer thickness in the region of the membrane, as a function of pressure.

While the oxide layer 5, in the case of conventional pressure sensors, is completely removed in the region of the membrane 15, in the case of the pressure sensor of the invention and in the case of its manufacturing method, the region 21 of the oxide layer 5 bordered by the groove 19 is purposely kept. This region 21 effects a marked reduction of the linearity error L of the pressure sensor. This is shown as follows, on the basis of finite element calculations, for three different pressure sensors. FIG. 7 shows the relative linearity error L1, L2, L3 in % for the three pressure sensors as a function of thereon acting pressure p normalized to −1 to 1 over the measuring range of the pressure sensor. All three pressure sensors are identically constructed, except for the thickness of oxide layer 5 in the region of the membrane 15, and have a membrane thickness of 20 μm. The calculations were based on the form of construction shown in FIGS. 4 and 6.

The first pressure sensor has, in the region of the membrane 15, no oxide layer. The curve of the linearity error L1 calculated for this pressure sensor is shown in FIG. 7 by diamond shaped measurement points.

In the case of the second pressure sensor, the region 21 of the oxide layer 5 bordered by the groove 19 was purposely kept and had a thickness of 1 μm. The curve of the linearity error L2 calculated for this pressure sensor is shown in FIG. 7 by square measurement points.

In the case of the third pressure sensor, the region 21 of the oxide layer 5 bordered by the groove 19 was likewise purposely kept, and had a thickness of 2 μm. The curve of the linearity error L3 calculated for this pressure sensor is shown in FIG. 7 by triangular measurement points.

A comparison of the curves of the linearity error L of the three pressure sensors shows that already in the case of an oxide layer thickness of 1 μm a clear reduction of the linearity error is obtained. An increasing of the oxide layer thickness to 2 μm leads to additional reduction. At the same time, the groove 19 provided on the membrane lower surface effects an increase in the sensitivity of the pressure sensor, since the groove 19 produces a concentrating of the pressure dependent, mechanical stresses at the piezoresistive elements 9. According to the invention, thus, simultaneously, an increase in sensitivity and a reduction of linearity error are obtained.

The invention claimed is:

1. A pressure sensor manufactured from a BESOI wafer having first and second silicon layers and an oxide layer arranged therebetween, wherein the pressure sensor comprises:
    an active layer formed from the first silicon layer of the BESOI wafer;
    piezoresistive elements doped in said active layer; and
    a membrane carrier formed from the second silicon layer of the BESOI wafer, wherein:
    said membrane carrier externally surrounds a cavity in the second silicon layer, via which a membrane forming region of said active layer and an oxide layer associated therewith are exposed; and
    in an outer edge of the region of the oxide layer exposed by said cavity, a groove is provided surrounding the region.

2. The pressure sensor as claimed in claim 1, wherein:
    said groove is a cavity in the oxide layer, which has, in cross section, a rounded geometry.

3. The pressure sensor as claimed in claim 1, wherein:
    said doped piezoresistive elements are located in said membrane at locations on said membrane upper surface, where said groove extends on the oppositely lying, membrane lower surface.

4. The pressure sensor as claimed in claim 1, wherein:
    said membrane formed by a region of said active layer and said region of the oxide layer associated therewith has a square footprint;
    and said piezoresistive elements are located in corners of such region of said active layer.

5. A method for manufacture of a pressure sensor from a BESOI wafer having first and second silicon layers and an oxide layer arranged therebetween, comprising the steps of:
    forming an active layer from the first silicon layer, into which piezoresistive elements are doped;
    forming a membrane carrier from the second silicon layer wherein:
    said membrane carrier externally surrounds a cavity in the second silicon layer, via which a membrane forming region of the active layer and an oxide layer associated therewith are exposed, wherein the cavity is formed by removing silicon present in the region of the cavity by means of an etching method, wherein the oxide layer serves as etch stop; and, etching a groove surrounding the region in an outer edge of the region of the oxide layer exposed by the cavity, the groove being etched by means of an isotropic etching method.

6. The method for manufacture of a pressure sensor as claimed in claim 5, wherein:
the groove is produced by:
applying a photomask by means of photolithography;
etching the groove into the oxide layer by means of a pure plasma etching with chemically reactive gases; and
removing the photomask.

7. The method for manufacture of a pressure sensor as claimed in claim 5, wherein the groove is produced by:
applying a photomask by means of photolithography;
etching the groove into the oxide layer by means of an isotropic, wet chemical process and
removing the photomask.

8. The method for manufacture of a pressure sensor as claimed in claim 7, wherein:
said isotropic wet chemical process comprises etching by means of an etching solution of hydrofluoric acid, nitric acid and acetic acid having different etching rates for silicon and silicon oxide.

9. The method for manufacture of a pressure sensor as claimed in claim 5, wherein the groove is produced by:
applying a photomask by means of photolithography;
etching the groove into the oxide layer by means of a combination of an isotropic, wet chemical etching procedure, and an isotropic, dry chemical etching procedure; and
removing the photomask.

10. The method for manufacture of a pressure sensor as claimed in claim 9, wherein:
the wet chemical etching procedure comprises applying hydrofluoric acid buffered with ammonium fluoride (BHF).

11. The method for manufacture of a pressure sensor as claimed in claim 9, wherein:
the dry chemical etching procedure comprises a Deep Reactive Ion Etching (DRIE).

12. The method for manufacturing of a pressure sensor as claimed in claim 10, wherein:
the dry chemical etching procedure comprises a Deep Reactive Ion Etching (DRIE).

13. The method for manufacturing of a pressure sensor as claimed in claim 6, wherein:
said chemical reactive gases comprise one of: $CF_4+O_2$ and $SF_6+O_2$.

* * * * *